US006816892B1

(12) United States Patent
Papierniak et al.

(10) Patent No.: US 6,816,892 B1
(45) Date of Patent: Nov. 9, 2004

(54) WEB-ON-CD

(75) Inventors: Karen A. Papierniak, St. Paul, MN (US); Luo-Jen Chiang, Freehold, NJ (US)

(73) Assignee: NCR Corporation, Dayton, OH (US)

( * ) Notice: Subject to any disclaimer, the term of this patent is extended or adjusted under 35 U.S.C. 154(b) by 937 days.

(21) Appl. No.: 09/040,919

(22) Filed: Mar. 18, 1998

(51) Int. Cl.[7] .............................................. G06F 15/16
(52) U.S. Cl. ...................................... 709/217; 709/219
(58) Field of Search ................................. 709/217, 220, 709/223, 228; 711/4, 112; 348/5.5; 345/327

(56) References Cited

U.S. PATENT DOCUMENTS

| | | | | |
|---|---|---|---|---|
| 5,005,122 A | * | 4/1991 | Griffin et al. | 364/220 |
| 5,668,872 A | * | 9/1997 | Morishima et al. | 380/4 |
| 5,682,330 A | * | 10/1997 | Seaman et al. | 364/551.01 |
| 5,721,815 A | * | 2/1998 | Otteesen et al. | 395/200.09 |
| 5,752,159 A | * | 5/1998 | Faust et al. | 455/5.1 |
| 5,778,368 A | * | 7/1998 | Hogan et al. | 707/10 |
| 5,787,470 A | * | 7/1998 | DeSimone et al. | 711/124 |
| 5,790,785 A | * | 8/1998 | Klug et al. | 395/188.01 |
| 5,808,662 A | * | 9/1998 | Kinney et al. | 348/15 |
| 5,809,145 A | * | 9/1998 | Slik et al. | 380/25 |
| 5,832,222 A | * | 11/1998 | Dziadosz et al. | 709/216 |
| 5,860,068 A | * | 1/1999 | Cook | 705/26 |
| 5,862,325 A | * | 1/1999 | Reed et al. | 709/201 |
| 5,864,848 A | * | 1/1999 | Hovitz et al. | 707/6 |
| 5,864,852 A | * | 1/1999 | Luotonen | 707/10 |
| 5,867,155 A | * | 2/1999 | Williams | 345/327 |
| 5,867,821 A | * | 2/1999 | Ballantyne et al. | 709/203 |
| 5,884,298 A | * | 3/1999 | Smith, II et al. | 707/2 |
| 5,894,571 A | * | 4/1999 | O'Conner | 395/652 |
| 5,901,228 A | * | 5/1999 | Crawford | 380/25 |
| 5,907,680 A | * | 5/1999 | Nielsen | 709/228 |
| 5,913,041 A | * | 6/1999 | Ramanathan et al. | 709/233 |
| 5,923,848 A | * | 7/1999 | Goodhand et al. | 709/219 |
| 5,925,119 A | * | 7/1999 | Maroney | 710/126 |
| 5,930,497 A | * | 7/1999 | Cherian et al. | 395/500 |
| 5,930,817 A | * | 7/1999 | Mizuno et al. | 711/114 |

(List continued on next page.)

FOREIGN PATENT DOCUMENTS

EP        834822        * 4/1998  ........... G06F/17/30

OTHER PUBLICATIONS

Angelaccio et al., Virtual Yahoo! an Example of virtual access to remote web catelogues, www.geckil.com/–18 harvest/mirror . . . thz.ch/www6/poster/, 10 pages, Apr. 1997.*

Microsoft Press, Dictionary of Computer terms 3rd editions, Microsoft Corporation, 2 Pages, 1997.*

Gustavson, MarketScape's WebCD Pro Publisher, http://www.emediapro.com, pp. 1–4 (4), Dec. 1997.*

FroeFront, WebWhacker, User's Guide, pp. 137, 1996.*

Bestavros et al., "Distributed Packet Rewriting", 1998, IEEE, pp. 8.*

Tewari et al., "High Availability in Clustered Multimedia Servers", 1996, IEEE, pp. 645–654 (10).*

Postel, RFC 882 "The Domain Names Plan and Schedule", Nov. 1883, http://rfc.fh–koeln.de/, pp. 1–9 (9).*

*Primary Examiner*—Bunjob Jaroenchonwanit
(74) *Attorney, Agent, or Firm*—Lowe Hauptman Gilman Berner LLP (57) ABSTRACT

A method and apparatus are disclosed for using an optical disk as a primary server in a network in order to reduce network access time and network traffic. According to the method, at least one optical disk is placed in a device which is connected to the network. Appropriate information from a server on the network is copied onto the optical disk so that the information on the optical disk may be accessed without directly accessing the server. The device may include a read-only optical drive, or a rewritable optical drive. The device may function cooperatively with a standard web server in order to perform backup functions.

12 Claims, 4 Drawing Sheets

U.S. PATENT DOCUMENTS

| | | | | |
|---|---|---|---|---|
| 5,931,912 A | * | 8/1999 | Wu et al. | 709/224 |
| 5,940,594 A | * | 8/1999 | Ali et al. | 709/203 |
| 5,941,954 A | * | 8/1999 | Kalajan | 709/239 |
| 5,978,807 A | * | 11/1999 | Mano et al. | 707/10 |
| 5,991,306 A | * | 11/1999 | Burns et al. | 370/429 |
| 5,995,943 A | * | 11/1999 | Bull et al. | 705/14 |
| 6,005,599 A | * | 12/1999 | Asai et al. | 348/7 |
| 6,138,237 A | * | 10/2000 | Ruben et al. | 713/200 |
| 6,141,298 A | * | 10/2000 | Miller | 369/30 |

* cited by examiner

WEB-ON-CD

TECHNICAL FIELD

The present invention relates to network communications and security, and more particularly to an arrangement for a network server that minimizes network traffic and unauthorized data uploads to the network server.

BACKGROUND ART

The Internet is not a physical or tangible entity, but rather a giant network which interconnects innumerable smaller groups of linked computer networks. It is thus a network of networks. This is best understood if one considers what a linked group of computers—referred to here as a "network"—is, and what it does. Small networks are now ubiquitous (and are often called "local area networks"). For example, in many United States Courthouses, computers are linked to each other for the purpose of exchanging files and messages (and to share equipment such as printers). These are networks.

Some networks are "closed" networks, not linked to other computers or networks. Many networks, however, are connected to other networks, which are in turn connected to other networks in a manner which permits each computer in any network to communicate with computers on any other network in the system. This global Web of linked networks and computers is referred to as the Internet.

The nature of the Internet is such that it is very difficult, if not impossible, to determine its size at a given moment. It is indisputable, however, that the Internet has experienced extraordinary growth in recent years. In 1981, fewer than 300 computers were linked to the Internet, and by 1989, the number stood at fewer than 90,000 computers. By 1993, over 1,000,000 computers were linked. Today, over 9,400,000 host computers worldwide, of which approximately 60 percent located within the United States, are estimated to be linked to the Internet. This count does not include the personal computers people use to access the Internet using modems. In all, reasonable estimates are that as many as 40 million people around the world can and do access the enormously flexible communication Internet medium. That figure is expected to grow to 200 million Internet users by the year 1999.

Some of the computers and computer networks that make up the Internet are owned by governmental and public institutions, some are owned by non-profit organizations, and some are privately owned. The resulting whole is a decentralized, global medium of communications—or "cyberspace"—that links people, institutions, corporations, and governments around the world. The Internet is an international system. This communications medium allows any of the literally tens of millions of people with access to the Internet to exchange information. These communications can occur almost instantaneously, and can be directed either to specific individuals, to a broader group of people interested in a particular subject, or the world as a whole.

To achieve this resilient nationwide (and ultimately global) communications medium, multiple links to and from each computer (or computer network) on the network has been created. Thus, a computer located in Washington, D.C. might be linked (usually using dedicated telephone lines) to other computers in neighboring states or on the Eastern seaboard. Each of those computers could in turn be linked to other computers, which themselves would be linked to other computers.

A communication sent over this redundant series of linked computers could travel any of a number of routes to its destination. Thus, a message sent from a computer in Washington, D.C., to a computer in Palo Alto, Calif., might first be sent to a computer (or router) in Philadelphia, and then be forwarded to a computer (or router) in Pittsburgh, and then to Chicago, Denver, and Salt Lake City, before finally reaching Palo Alto. If the message could not travel along that path (because of military attack, simple technical malfunction, or other reason), the message would automatically (without human intervention or even knowledge) be re-routed, perhaps, from Washington, D.C. to Richmond, and then to Atlanta, New Orleans, Dallas, Albuquerque, Los Angeles, and finally to Palo Alto. This type of transmission, and re-routing, would likely occur in a matter of seconds.

Messages between computers on the Internet do not necessarily travel entirely along the same path. The Internet uses "packet switching" communication protocols that allow individual messages to be subdivided into smaller "packets" that are then sent independently to the destination, and are then automatically reassembled by the receiving computer. While all packets of a given message often travel along the same path to the destination, if computers along the route become overloaded, then packets can be re-routed to less loaded computers.

As the communication (information) is sent along the "path" from link to link, information is continually gathered from the link sites via servers. For example, information such as the operating system, software content of the server, network software and pages of the server may be downloaded at each server site as the information travels from server to server. Hence, network access time and traffic is increased.

Accordingly, there exists a need in the art for users of a network to quickly access information while decreasing the access time and traffic on the network. There also exists a need in the art for quick access to information that is readily accessible to different users at different locations throughout the network.

SUMMARY OF THE INVENTION

To overcome the above-identified disadvantages and shortcomings of the prior art, it is a feature and advantage of the present invention to provide users of a network with quick access to information while decreasing the access time and traffic on the network.

It is another feature and advantage of the present invention to provide quick access to information that is readily accessible to different users at different locations throughout the network.

According to one aspect of the invention, there exists a method for using an optical disk as a server in a network, such as the world wide web, reducing network access time and traffic. According to the method, at least one optical disk is placed in a device, at least one device is connected to the network, information from a server on the network is copied onto the optical disk, and the information on the optical disk is accessed without directly accessing the server.

In one embodiment of the invention, the method reproduces information stored on the optical disk onto a plurality of secondary optical disks, distributes the optical disks and plurality of secondary optical disks, and updates information stored on the optical disk and plurality of secondary optical disks by copying updated information from the server onto the optical disk and plurality of secondary optical disks.

In another embodiment of the invention, the optical disk acts as a back-up for the information copied onto the server.

According to another aspect of the invention, a device is configured for connection to a network for reducing network access time and network traffic. At least one optical disk, placed in the device, includes information copied from a server on the network, and enables a user to access the information on the optical disk without having to access the server directly.

In one embodiment of the invention, the information on the disk includes the operating system, web server software, network software, and web pages.

BRIEF DESCRIPTION OF THE DRAWINGS

For a more complete understanding of the present invention and the advantages thereof, reference is now made to the following descriptions taken in conjunction with the accompanying drawings in which like numbers designate like parts, and in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus (or devices) for performing these operations. This apparatus may be specially constructed for the required purpose or it may comprise a general purpose computer as selectively activated or reconfigured by a computer program stored in the computer. Additionally, the apparatus includes appropriate hardware and computing instructions for establishing a connection to a network. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will become readily apparent from the description given.

BEST MODE FOR CARRYING OUT THE INVENTION

A method and apparatus for reducing network access time and traffic are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
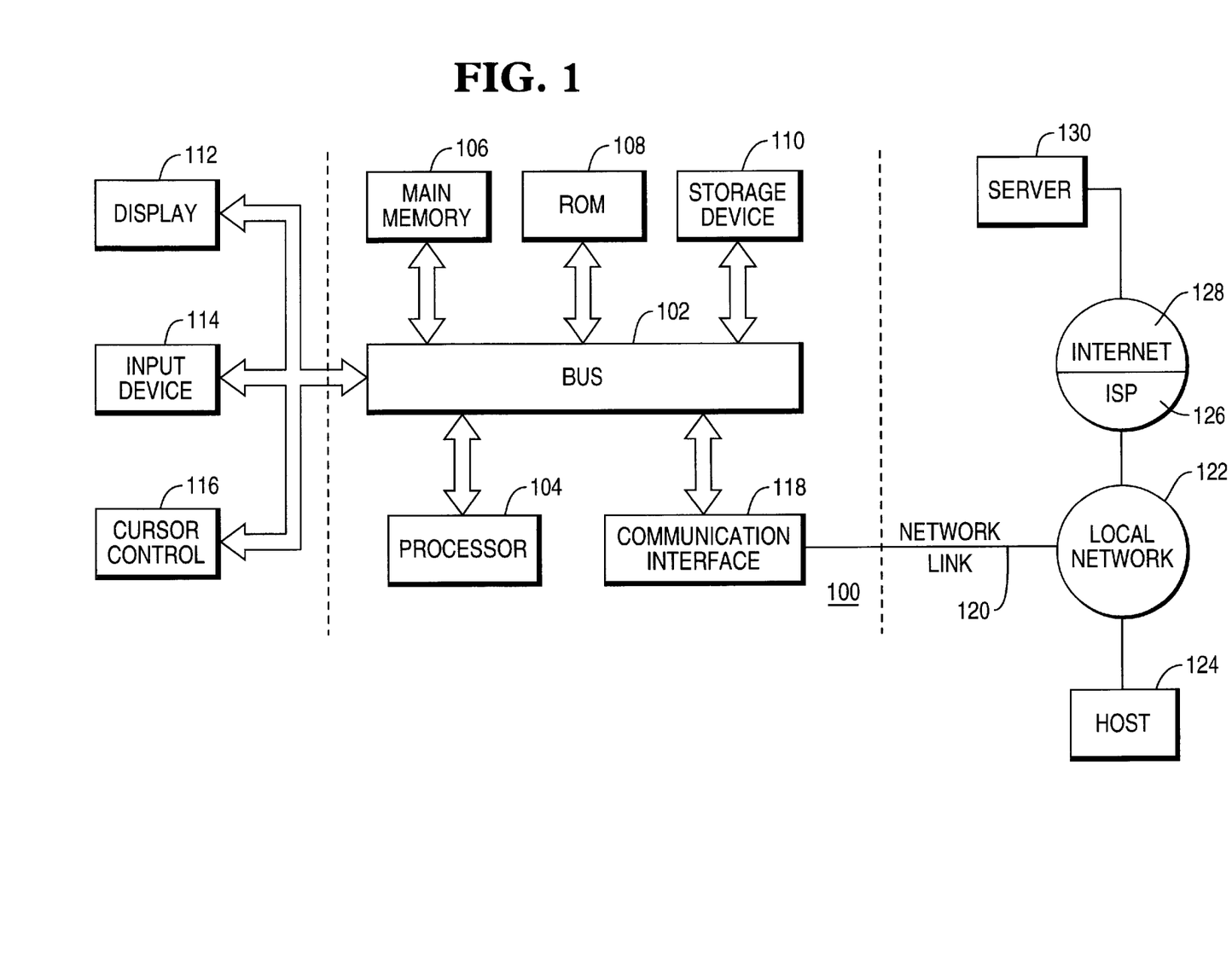
FIG. 1 is a block diagram which illustrates a computer system upon which an embodiment of the invention may be implemented.

FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of a device such as computer system 100 to transfer information across a network. According to one embodiment of the invention, information is provided by an apparatus, such as computer system 100, in response to processor 104 executing sequences of instructions contained in main memory 106. Such instructions may be read into main memory 106 from another computer-readable medium, such as storage device 110 or an optical disk. However, the computer-readable medium is not limited to devices such as storage device 110.

For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet-switched data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

NETWORK OVERVIEW

Figure 2:
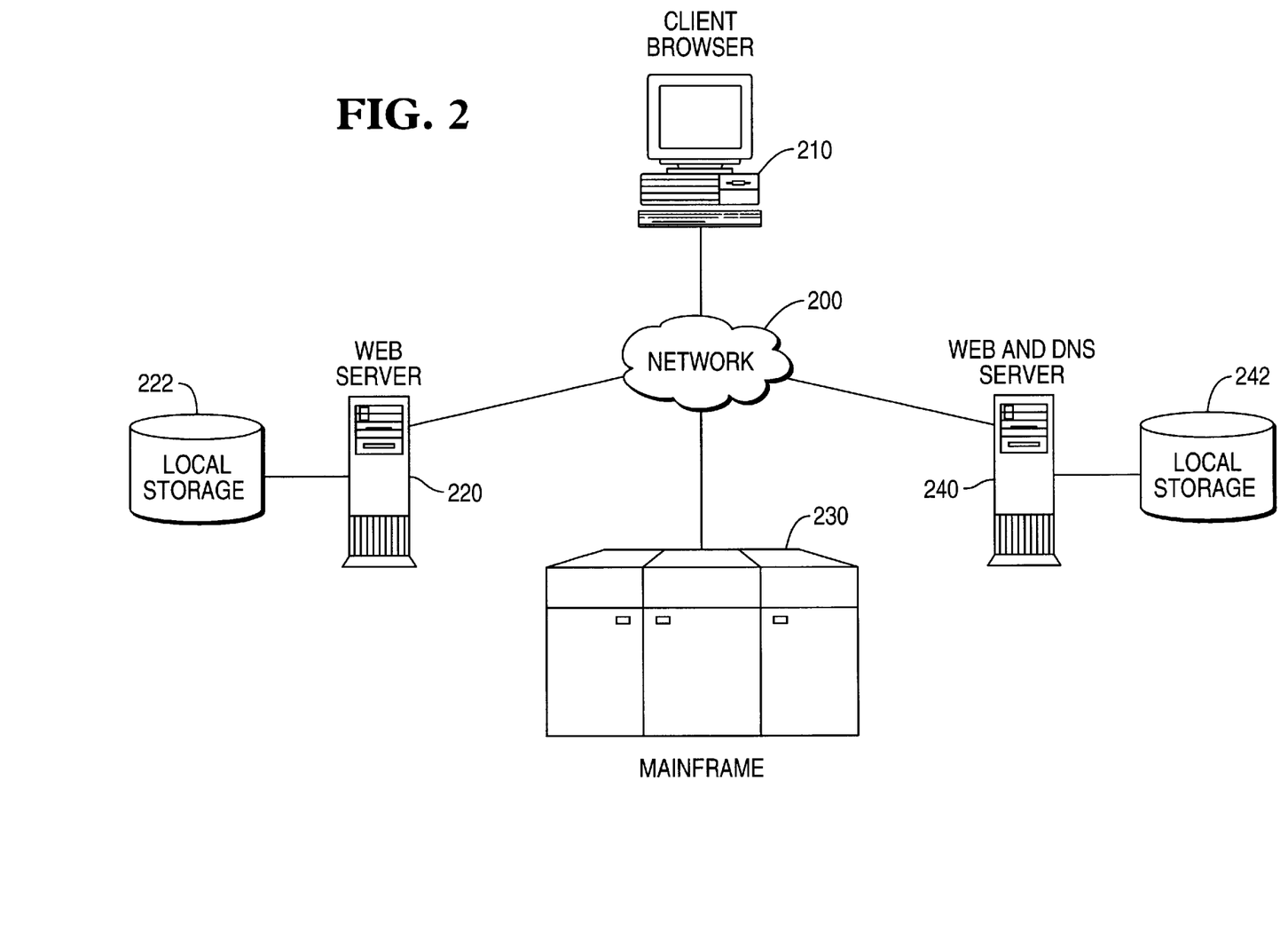
FIG. 2 is a diagram of a network within which the present invention may be implemented.

Referring to FIG. 2, depicted is a network 200 within which the present invention may be implemented. A web server 220 according to one embodiment of the present invention gathers information dynamically from one or more data sources, which may be located at different servers and have incompatible formats, structures the information into an object-oriented, information model, and outputs the information for the user according to an associated visual representation. The information model and the visual representation are defined by human operators according to their own needs, purposes, and preferences as part of the configuration of the server. Multiple information models and visual representations may be defined for any server.

A user may access the web server 220 by executing a web browser at client 210. Web browsers are well-known in the art, and are readily available from such corporations as Netscape Communications Corp. and Microsoft Corp. In order to access the web server 220, the user at client browser 210 activates a hyperlink having a URL (Uniform Resource Locator) of the following form:

TABLE 1 http: //www.server.com/query.pl?Class=Seed&View=Paradigm

In the exemplary URL, the network address of the web server 220 is specified as "www.server.com" and the portion of the URL after the question mark (?) hold user specified parameters. The Class and Seed parameters, as explained in more detail hereinafter, indicate an object about which a user intends to discover information. The object is visualized according a paradigm specified by the Paradigm parameter, also explained in more detail hereinafter.

When the hyperlink is activated, the web server 220 receives a request to initiate an information discovery session, specified by parameters embedded in the URL. In response, the web server 220 gathers information from one or more data sources. The data sources can have incompatible formats, e.g. web page, relational database, spreadsheet, text file, etc. The data sources can be stored at a plurality of sites, for example, locally with respect to the web server 220, such as a hard disk at local storage 222, or externally at another site in the network, e.g. at mainframe 230. In fact, the data source can even be another, remote information discovery web server 240.

WEB SERVER ARRANGEMENT

Figure 3:
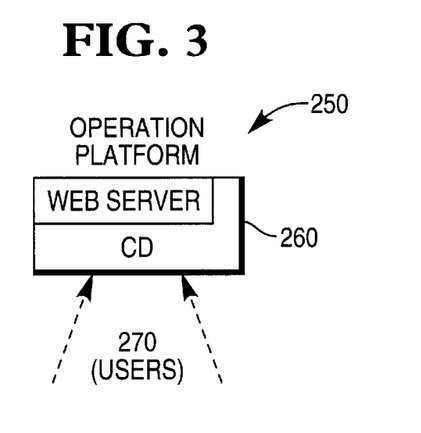
FIG. 3 is a block diagram of a device in an embodiment of the present invention.

FIG. 3 illustrates a device 250 configured for connection to a network 200 and providing network services in accordance with the present invention. The device 250 may be in the form of a computer system executing a web browser program, and connected to the network 200, and configured to retrieve data from an optical disk 260 such as a CD ROM. The optical disk 260 used with the device 250 includes information which is copied from a server 220 on the network 200. This information includes data files which may be used for reference as well as executable program files. The information stored on the optical disk 260 also includes software to configure the device 250 for functioning as a web server 220. Hence, the device 250 shown in FIG. 3 is capable of executing the software and functioning as a stand alone web server 220 with access to the network 200. Once configured, users 270 may remotely access the device 250 and retrieve information.

Various methods may be used to store the information on the optical disk 260. For example, the device 250 may be configured to include a rewritable CD ROM drive (not shown). Thus, information may be selectively copied onto the optical disk 260, provided that sufficient supervisory privileges are available to an operator. Additionally, the device 250 may be provided with a read only drive (not shown) for accessing information stored on the optical disk 260. Hence, an additional recordable drive would be necessary for updating information on the optical disk 260 when necessary. Alternatively, the optical disk 260 may be produced at a predetermined location and transferred to the device 250. By providing information on an optical disk 260, the present invention minimizes unauthorized access to the web server 220 as well as unauthorized updates of information stored on the optical disk 260.

Figure 4:
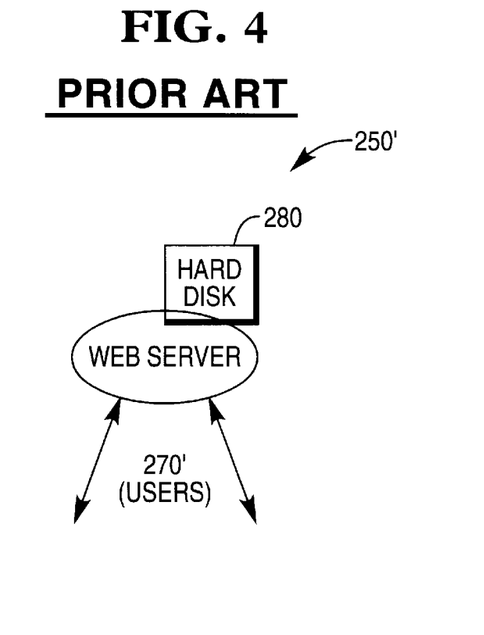
FIG. 4 is a block diagram of a prior art device.

FIG. 4 illustrates a typical arrangement for a network device 250' according to the prior art. In contrast to the present invention, prior art devices 250' store and retrieve information from a fixed storage media such as a hard disk drive 280. A major problem associated with the use of a hard disk drive 280 stems from the fact that information may be readily written and retrieved to and from the drive 280. Hence, security breaches are often encountered wherein an unauthorized user 270' gains access to the network device 250' and transfers self-destructive information such as viruses onto the drive 280. While many security protocols exist for minimizing unauthorized access, none can be considered foolproof. Young hackers are continually developing programs and techniques to overcome current security protocols and measures. Hence, a network 200, or web server 220, which implements a particular security protocol may be incapable of preventing unauthorized accesses for very long periods of time.

According to the present invention, a plurality of devices 250 may be strategically positioned at various physical locations and connected to the network 200. Each device 250 would include an optical disk 260 containing identical information stored thereon. Once connected to the network 200, information may be retrieved from the nearest site containing one of the devices 250, thereby minimizing the network traffic. For example, if a user 270 remotely accesses a web server 220 located in a different country or state, and desires to retrieve certain files from the web server 220 to their local machine, the file must be segmented and transmitted along the network 200, which is typically packet switching network. At each routing station, a routing algorithm must be implemented to determine the shortest path to the next station. According to the present invention, if the information that the user 270 is attempting to retrieve is available on the optical disk 260, then the information is retrieved from the nearest physically located device 250 containing one of the optical disks 260. Hence, the transmission time and network traffic is reduced.

Figure 5:
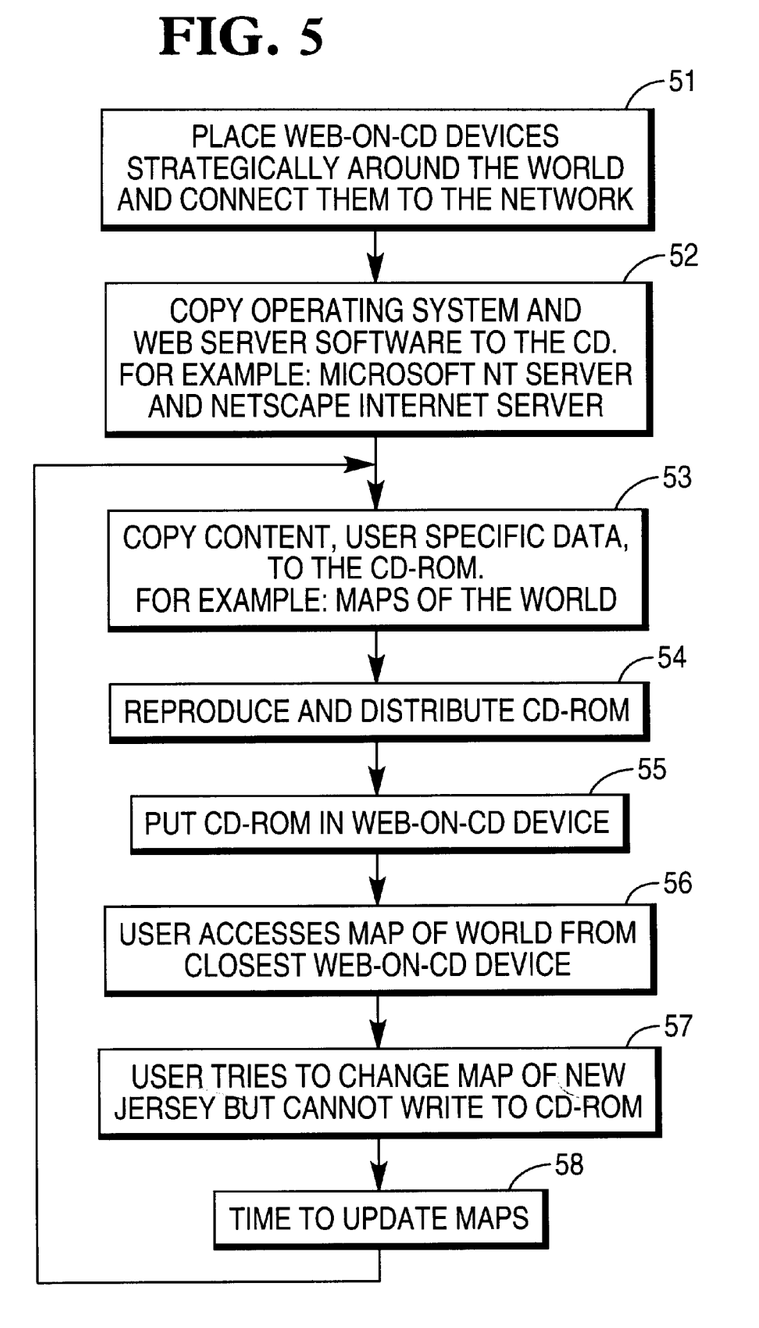
FIG. 5 is a flow diagram of a method for using a device in an embodiment of the present invention.

FIG. 5 illustrates a method for using the device 250 of the present invention. At step 51, one or more devices 250 are configured for operation over the network 200. The configuration step includes providing all the necessary hardware to operate the device 250 as well as providing physical connections to the network 200. Additionally, strategic locations for placing the devices 250 must be determined so that network traffic can be effectively minimized. At step 52, the optical disk 260 is prepared. The preparation step involves transferring appropriate information and software onto the optical disk 260 in order to operate the device 250. At step 53, user specific data is copied onto the optical disk 260. For example, if the optical disk 260 is to contain information relating to map coordinates of a particular country or area then all of the data is copied onto the optical disk 260. Additionally, appropriate software for configuring the device 250 to properly access the data must be copied onto the optical disk 260. The software works in conjunctions with operating systems in current use in order to properly configure the device 250. Once copied onto the optical disk 260, the software may be accessed by the device 250 to configure the device for functioning as a web server 220.

At step 54, the optical disk 260 is reproduced and distributed to each device 250 located at the predetermined strategic locations. When a user 270 connects to one of the web servers 220, 240 and desires to retrieve information that is contained on the optical disk 260, the DNS server 240 determines which of the devices 250 is closest to the location of the user 270. At step 56 the user 270 accesses information on the optical disk 260 contained in the nearest device 250 rather than the actual web server 220,240 to which he or she is connected.

It is often during this time that unauthorized users such as hackers will attempt to transfer destructive information to the web server 220. For example, at step 56 a user 270 attempts to change part of the content of the information contained on the optical disk 260. Since the optical disk 260 provides users 270 with read-only access to information and is incapable of allowing a user 270 to write information thereon, the user 270 is unable to change the contents of the information.

At step 58, an appropriate supervisory personnel determines that information contained on the optical disk 260 is outdated and must be changed. The optical disks 260 are removed from the devices 250 and replaced with updated versions thereof.

Figure 6:
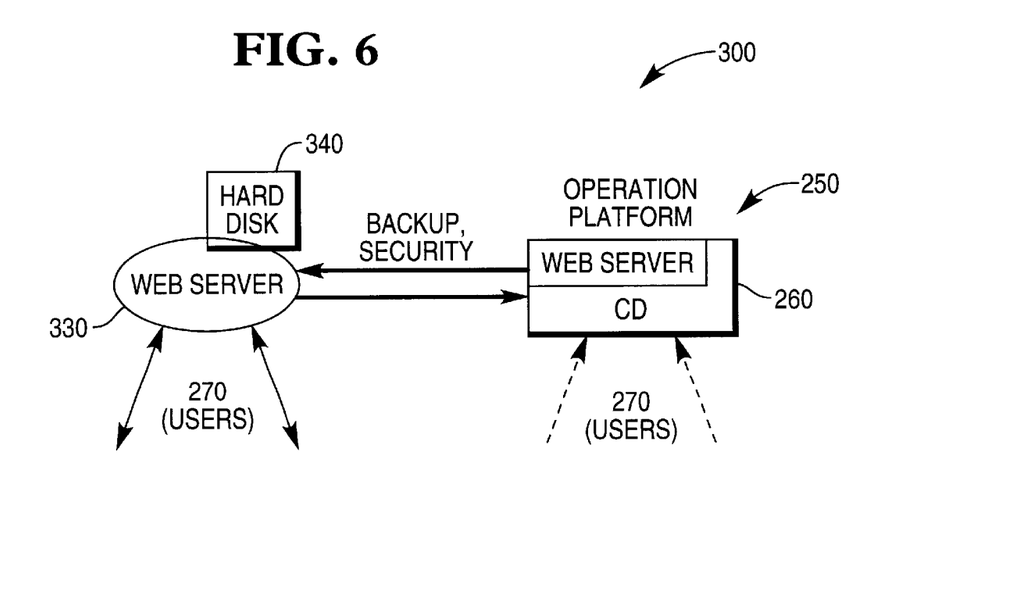
FIG. 6 is a block diagram of an alternative embodiment for the device of the present invention.

FIG. 6 illustrates an embodiment for a system 300 according to the present invention. The system 300 includes a device 250 configured for connection to a network 200. As previously described, the device 250 is configured for retrieving data from an optical disk 260. The system 300 includes a web server 330 which is also configured for connection to the network 200. The web server 330 utilizes a fixed storage medium such as a hard disk 340 as the primary source of data storage and retrieval. The device 250 is capable of communicating and exchanging data with the web server 330 using standard physical connections or appropriate wireless connections.

According to the embodiment illustrated in FIG. 6, users 270 may retrieve information from both the device 250 and the web server 330. Additionally, users 270 may transfer information to the web server 330. The device 250 functions as a backup system for the web server 330 and contains the identical data originally stored on the web server 330 prior to connection to the network 200. For example, if a user 270 transfers a virus to the web server 330, a significant amount of data may be lost or corrupted. Hence, the web server 330 must be disconnected from the network 200 and serviced. In such an event, the device 250 may be used to quickly transfer the original data to the web server 330, thereby minimizing down time. In certain situations, data may be transferred to the web server 330 without any down time.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A method for using an optical disk as a primary server in a network, reducing network access time and traffic, comprising the steps of:

placing at least one optical disk in at least one device;

connecting the at least one device to the network;

copying information and software from a server in the network to the at least one optical disk;

accessing said software stored on the at least one optical disk by the at least one device to configure the at least one device for functioning as a primary server, and for properly accessing said information stored on the at least one optical disk; and accessing, by a user, said information stored on the optical disk without directly accessing the server.

2. The method for using an optical disk in accordance with claim 1, further comprising the steps of:

reproducing the information and software copied onto the at least one optical disk onto a plurality of optical disks;

distributing the plurality of optical disks to a plurality of devices connected at different locations throughout the network, each of the plurality of devices accessing said software stored on the distributed optical disks to be configured for functioning as primary servers, and for allowing said user to access said information stored on the distributed optical disks without directly accessing the server.

3. The method for using an optical disk in accordance with claim 2, further comprising the step of updating the information stored on the at least one optical disk and plurality of optical disks by copying updated information from the server onto the at least one optical disk and plurality of optical disks.

4. The method for using an optical disk in accordance with claim 2, wherein said user accesses said information stored on one or more of the plurality of optical disks distributed to one of the plurality of devices which is physically located closest to said user, thereby reducing network access time and traffic.

5. The method for using an optical disk in accordance with claim 1, wherein the software and information copied in the copy step include the operating system, server software, and network software, and web pages, respectively.

6. The method for using an optical disk in accordance with claim 1, wherein the at least one optical disk and the at least one device are configured to operate as a web server.

7. The method for using an optical disk in accordance with claim 1, wherein the information copied onto the at least one optical disk acts as a back-up for the server.

8. A device configured as a primary server connected to a network for reducing network access time and traffic, comprising:

at least one optical disk including information and software copied from a server on the network, said device assessing said software stored on the at least one optical disk to be configured for functioning as a primary server, and for enabling a user to access the information stored on the at least one optical disk without having to access the server.

9. The device configured for connection to a network in accordance with claim 8, wherein the software and information stored on the at least one disk include the operating system, server software, and network software, and pages of the server, respectively.

10. The device configured for connection to a network in accordance with claim 8, wherein the device and the at least one optical disk are configured to operate as a web server.

11. A system connected to a network for reducing network access time and traffic, comprising a plurality of devices connected at different locations throughout the network, each device including one or more distributed optical disks storing thereon information and software copied from a server on the network, each device assessing said software stored on its respective optical disks to be configured for functioning as a primary server, and for enabling a user to access the information stored on the respective optical disks without having to directly access the server.

12. The system of claim 11, further comprising a DNS server for determining which device among the plurality of devices is physically located closest to said user, thereby enabling said user to access the information stored on the respective optical disks of said closest device.

* * * * *